(12) United States Patent
Nagahama et al.

(10) Patent No.: US 6,639,653 B2
(45) Date of Patent: Oct. 28, 2003

(54) DOUBLE TELECENTRIC OBJECTIVE LENS

(75) Inventors: Tatsuya Nagahama, Kawasaki (JP); Katsuyoshi Arisawa, Tokyo (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 10/174,220

(22) Filed: Jun. 18, 2002

(65) Prior Publication Data

US 2003/0043355 A1 Mar. 6, 2003

(30) Foreign Application Priority Data

Jun. 19, 2001 (JP) ........................................ 2001-185241

(51) Int. Cl.$^7$ ................. G03B 27/54; G03B 27/42; G02B 13/22
(52) U.S. Cl. ..................... 355/67; 355/53; 359/663
(58) Field of Search ................. 355/53, 55, 67–71; 359/649–651, 656–663, 671

(56) References Cited

U.S. PATENT DOCUMENTS

| 5,004,348 A | | 4/1991 | Magome |
| 5,708,532 A | * | 1/1998 | Wartmann ............... 359/663 |
| 5,936,711 A | | 8/1999 | Miyai et al. |
| 6,133,986 A | | 10/2000 | Johnson |
| 6,198,577 B1 | * | 3/2001 | Kedar et al. ............. 359/663 |
| 6,259,508 B1 | * | 7/2001 | Shigematsu .............. 355/53 |

* cited by examiner

Primary Examiner—Henry Hung Nguyen
(74) Attorney, Agent, or Firm—Rankin, Hill, Porter & Clark LLP

(57) ABSTRACT

A double telecentric objective lens includes a front group and a rear group each having a positive refracting power as a whole. The front group includes a first unit and a second unit. The first unit is formed of a cemented lens composed of a convex lens and a concave lens. The second unit includes a convex lens or a cemented lens composed of a convex lens and a concave lens, and a concave lens. The rear group includes a third unit and a fourth unit. The third unit includes a concave lens and a cemented lens composed of a convex lens and a concave lens. The fourth unit is formed of a cemented lens composed of a convex lens and a concave lens. In the above configuration, the optical constants of the lenses are determined so as to satisfy the following conditions:

$$n_{1n} - n_{1p} > 0.1 \quad (1)$$

$$\nu_{1p} - \nu_{1n} > 25 \quad (2)$$

$$0.3 f_F - r_{2n} < 0.5 f_F \quad (3)$$

$$1.4 < (r_{2p}/r_{2n}) < 2.7 \quad (4)$$

$$n_{3n} < n_{3p} \quad (5)$$

1 Claim, 8 Drawing Sheets

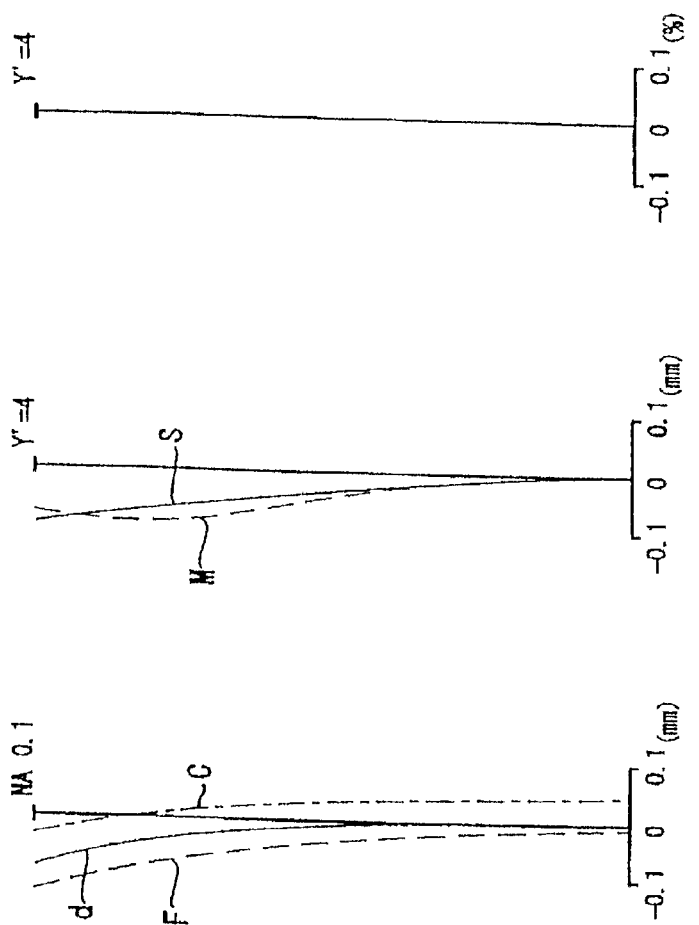

DOUBLE TELECENTRIC OBJECTIVE LENS

BACKGROUND OF THE INVENTION

1. Field of the Invention

The present invention relates to a double telecentric objective lens.

2. Description of the Related Art

With recent developments in image processing technology, various image processing and measuring apparatuses have been commercialized. Objects to be measured are diversified and complicated, and there is a need to measure, by image processing and measuring apparatuses, relatively large and thick machine parts, cutting tools, electronic parts, and the like that have hitherto been measured by measuring projectors.

For this reason, the emergence of a telecentric objective lens having a low magnification of 1× or less is required, in which the field of view is wide, the depth of field is large enough to measure thick machine parts having a stepped portion, and the like, and the telecentricity (the degree of parallelizm between the principal ray of an off-axis beam and the optical axis) is properly corrected.

Preferable as a telecentric objective lens used for measurement is a so-called double telecentric objective optical system in which lenses are divided into two groups, a front group and a rear group, the back focus of the front group and the front focus point of the rear group coincide with each other, and a diaphragm is placed at the position where the focus points coincide. This is because the image magnification of the double telecentric optical system is basically determined only by the focal lengths of the front group and the rear group, regardless of the position of an object.

SUMMARY OF THE INVENTION

In view of such circumstances, it is an object of the present invention to provide a double telecentric objective lens having a magnification of approximately 0.2× in which aberrations and the telecentricity of the principal ray of an off-axis beam are properly corrected, and which is suitable for use in an image processing and measuring apparatus.

In order to achieve the above object, according to one aspect, the present invention provides a double telecentric objective lens having a double telecentric optical system. The double telecentric optical system includes a front group having a positive refracting power as a whole, and a rear group having a positive refracting power as a whole. The rear focus of the front group and the front focus of the rear group coincide with each other, and a diaphragm is placed at the position where the focuses coincide. The front group includes a first unit formed of a cemented lens composed of a convex lens and a concave lens, and having a positive refracting power as a whole, and a second unit including a convex lens or a cemented lens composed of a convex lens and a convex lens, and a concave lens, arranged in that order from the object side, and having a positive refracting power as a whole. The rear group includes a third unit including a concave lens and a cemented lens composed of a convex lens and a concave lens, and having a positive refracting power as a whole, and a fourth unit formed of a cemented lens composed of a convex lens and a concave lens, and having a positive refracting power as a whole.

The double telecentric objective lens satisfies the following conditions:

$$n_{1n} - n_{1p} > 0.1 \quad (1)$$

$$\nu_{1p} - \nu_{1n} > 25 \quad (2)$$

$$0.3 f_F < |r_{2n}| < 0.5 f_F \quad (3)$$

$$1.4 < (r_{2p}/r_{2n}) < 2.7 \quad (4)$$

$$n_{3n} < n_{3p} \quad (5)$$

where $n_{1p}$ and $\nu_{1p}$ respectively represent the refractive index and the Abbe's number of the convex lens of the first unit, $n_{1n}$ and $\nu_{1n}$ respectively represent the refractive index and the Abbe's number of the concave lens of the first unit, $r_{2p}$ represents the radius of curvature of a surface of the convex lens or the cemented lens composed of the convex lens and the concave lens in the second unit that is furthermost from an object, $r_{2n}$ represents the radius of curvature of an object-side surface of the concave lens in the second unit, $f_F$ represents the focal length of the entire front group, $n_{3n}$ represents the average refractive index of the concave lenses in the third unit, $n_{3p}$ represents the refractive index of the convex lens in the third unit, and the refractive indices and the focal length are values for the d-line (587.56 nm).

Conditional expression (1) specifies the refractive indices of the lenses included in the first unit.

If conditional expression (1) is not satisfied, the difference in refractive index between the convex lens and the concave lens decreases. Therefore, when spherical aberration and the telecentricity of the principal ray are corrected, the radius of curvature of the bonding surface decreases, and a high-order aberration, such as spherical aberration, occurs. Moreover, since the principal ray emitted from the vicinity of the object and in parallel with the optical axis greatly deviates from the center of the telecentric diaphragm, the principal ray of a light beam passing through the center of the telecentric diaphragm forms a large angle with respect to the optical axis.

When an object having a stepped portion is measured with such an objective lens, a serious measurement error occurs around the object.

Conditional expression (2) specifies the Abbe's numbers of the lenses used in the first unit.

If chromatic aberration is corrected using glass materials that do not satisfy conditional expression (2), the refractive powers of both the convex lens and the concave lens must be increased, and this results in a high-order aberration such as spherical aberration or comatic aberration. The telecentricity of an off-axis beam also deteriorates. The high-order aberration cannot be completely corrected by other lens units.

In other words, conditional expressions (1) and (2) are determined so as to minimize spherical aberration, comatic aberration, and chromatic aberration, and the deterioration of telecentricity of an off-axis principal ray.

Conditional expression (3) specifies the radius of curvature of an object-side surface of the concave lens in the second unit.

When the radius of curvature exceeds the upper limit in conditional expression (3), spherical aberration or the like that occurs at another position is not sufficiently corrected, and correction of aberration in the entire front group is insufficient. The telecentricity of the principal ray is not also completely corrected.

When the radius of curvature falls below the lower limit in conditional expression (3), an excessive positive aberration occurs at this surface. In this case, the balance cannot be achieved even by producing negative aberrations at another surface, or a large high-order aberration occurs.

Conditional expression (4) specifies the radius of curvature $r_{2p}$ of a surface of the convex lens or the cemented lens composed of the convex lens and the concave lens that is furthermost from the object in the second unit, and the radius of curvature $r_{2n}$ of an object-side surface of the concave lens in the second unit.

This condition is necessary to achieve a balance between negative aberrations caused at the surface having the radius of curvature $r_{2p}$ and positive aberrations caused at the surface having the radius of curvature $r_{2n}$, to correct aberrations in the entire front group including residual aberration caused in the first unit, and to maintain high telecentricity of the principal ray emitted from the object.

Positive aberrations at the surface with $r_{2n}$ increase above the upper limit in conditional expression (4), and negative aberrations at the surface with $r_{2p}$ increase below the lower limit. When any of the aberrations is compensated for in another unit, the degree of compensation increases. Consequently, high-order aberration cannot be prevented, and the telecentricity of the principal ray of an off-axis beam deteriorates.

That is, the conditions in conditional expressions (3) and (4) are necessary to maintain the balance of the aberrations in the entire front group, and to properly correct the telecentricity of the principal ray of the off-axis beam.

Conditional expression (5) specifies the refractive indices of the convex lens and the concave lenses in the third unit.

In order to minimize aberrations in the third unit including high-order aberrations, such as spherical aberration and comatic aberration, the convex lens is made of a glass material having a high refractive index. Further, in order to limit the Petzval sum so as to properly correct astigmatism, the convex lens is made of a glass material having a high refractive index, and the concave lenses are made of a glass material having a low refractive index.

When the convex lens and the concave lenses are made of glass materials that do not satisfy conditional expression (5), the Petzval sum increases, and therefore, astigmatism increases.

This condition is necessary, in particular, to properly correct astigmatism in the entire optical system including the front group and the rear group.

Further objects, features and advantages of the present invention will become apparent from the following description of the preferred embodiments with reference to the attached drawings.

BRIEF DESCRIPTION OF THE DRAWINGS

FIGS. 8A, 8B, and 8C are explanatory views showing spherical aberration, astigmatism, and distortion in the double telecentric objective lens of the fourth embodiment.

DESCRIPTION OF THE PREFERRED EMBODIMENTS

Embodiments of the present invention will be described below with reference to the attached drawings.

[First Embodiment]

Figure 1:
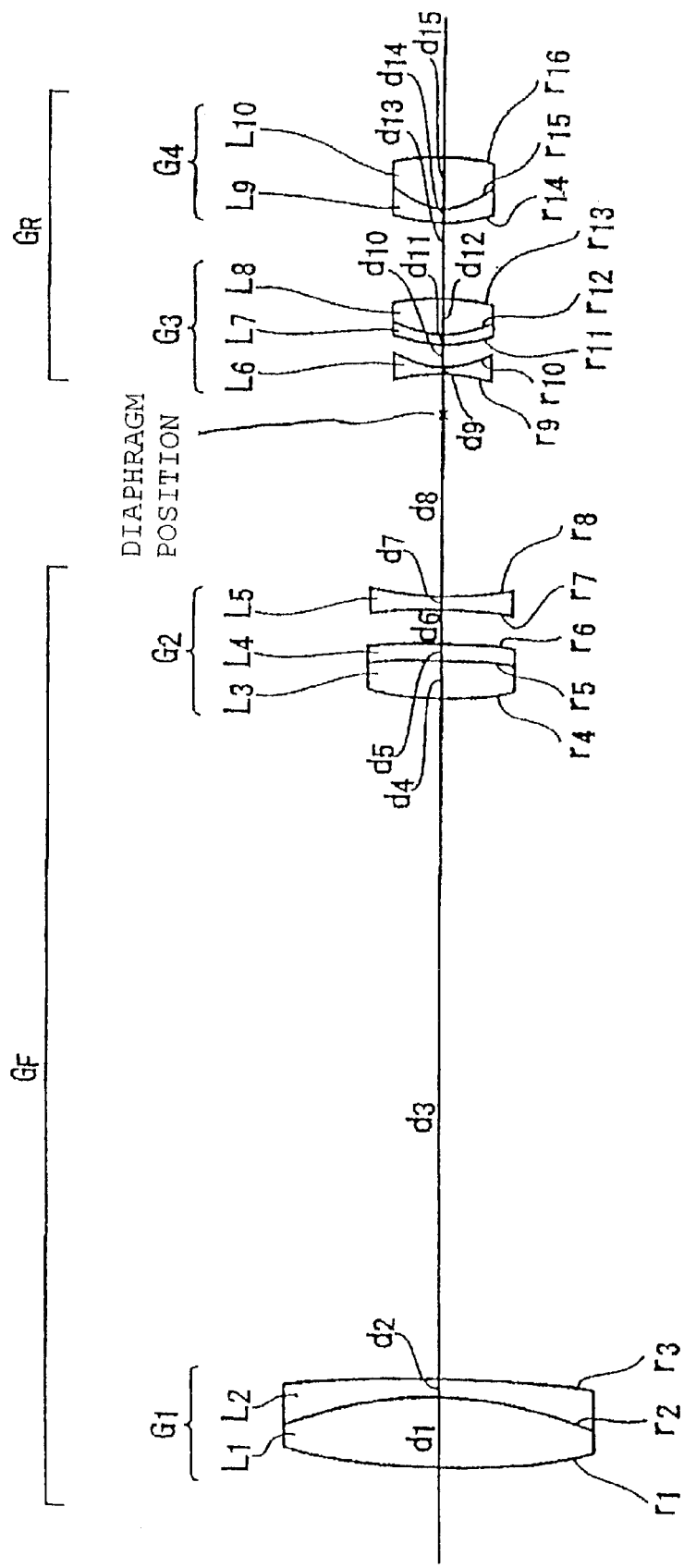
FIG. 1 is a structural view of a double telecentric objective lens according to a first embodiment of the present invention.
Figure 2:
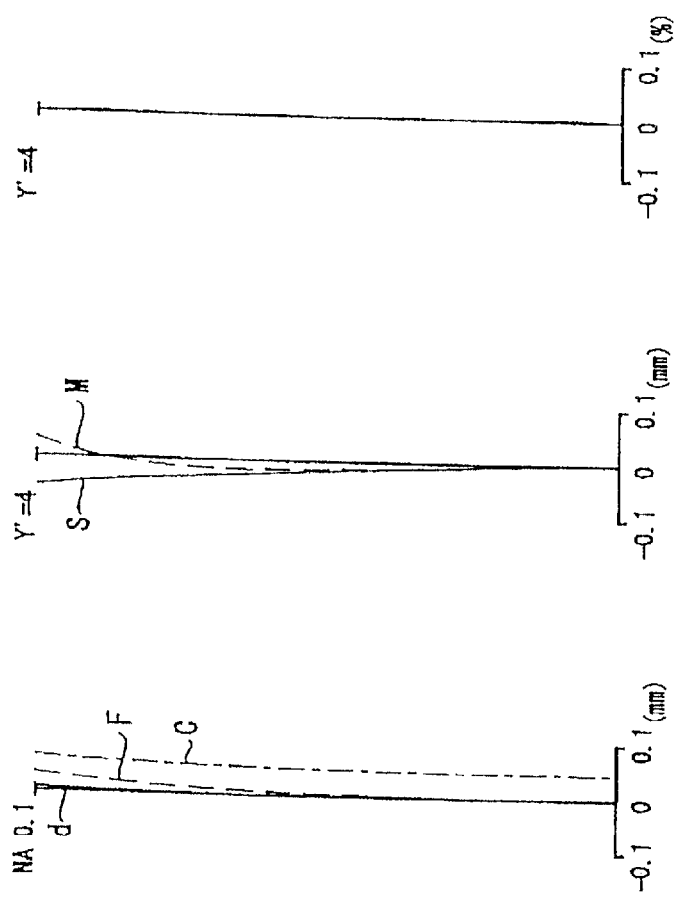
FIGS. 2A, 2B, and 2C are explanatory views showing spherical aberration, astigmatism, and distortion in the double telecentric objective lens of the first embodiment.

FIG. 1 shows the configuration of a double telecentric objective lens according to a first embodiment of the present invention, and FIGS. 2A, 2B, and 2C explain spherical aberration, astigmatism, and distortion in the first embodiment.

A double telecentric objective lens of this embodiment is composed of a front group $G_F$ having a positive refracting power as a whole, and a rear group $G_R$ having a positive refracting power as a whole. The front group $G_F$ and the rear group $G_R$ are placed so that the back focus of the front group $G_F$ and the front focus of the rear group $G_R$ coincide with each other. A diaphragm is placed at the position where the focuses coincide. Thus, a double telecentric optical system is constructed.

The front group $G_F$ comprises a first unit $G_1$ formed of a cemented lens composed of a convex lens $L_1$ and a concave lens $L_2$, and having a positive refracting power as a whole, and a second unit $G_2$ including a cemented lens composed of a convex lens $L_3$ and a concave lens $L_4$, and a concave lens $L_5$ arranged in that order from the object side, and having a positive refracting power as a whole.

The rear group $G_R$ includes a third unit $G_3$ a concave lens $L_6$ and a cemented lens composed of a concave lens $L_7$ and a convex lens $L_8$, and having a positive refracting power as a whole, and a fourth unit $G_4$ formed of a cemented lens composed of a concave lens $L_9$ and a convex lens $L_{10}$, and having a positive refracting power as a whole.

In such a configuration, the optical constants of the lenses are set as in Table 1 on conditions in which the object position is −150.021 mm, the focal length of the front group (the focal length of the entire front group) $f_F$ is 150.02 mm, the image position is 33.170 mm, the focal length of the rear group is 30.02 mm, and the (imaging) magnification is −0.2×. The position of the diaphragm is placed at a position offset by 32.369 mm from a surface $r_8$ toward the image.

Herein, $L_1$ to $L_{10}$ denote lenses, $r_1$ to $r_{16}$ denote the radii of curvature of the lens surfaces, $d_1$ to $d_{15}$ denote the thicknesses of the lenses or the spaces therebetween, $n_1$ to $n_{10}$ denote the d-line refractive indices of glass materials, and $v_1$ to $v_{10}$ denote the Abbe's numbers of the glass materials.

TABLE 1

| | | | | | | | | |
|---|---|---|---|---|---|---|---|---|
| $r_1$ | 124.891 | $d_1$ | 12 | $n_1$ | 1.48749 | $v_1$ | 70.2 | $L_1$ |
| $r_2$ | −68.541 | $d_2$ | 3 | $n_2$ | 1.62004 | $v_2$ | 36.3 | $L_2$ |
| $r_3$ | −192.006 | $d_3$ | 120 | | | | | |
| $r_4$ | 62.481 | $d_4$ | 7 | $n_3$ | 1.6968 | $v_3$ | 55.5 | $L_3$ |
| $r_5$ | −81.461 | $d_5$ | 3 | $n_4$ | 1.64769 | $v_4$ | 33.8 | $L_4$ |
| $r_6$ | −112.691 | $d_6$ | 5.9 | | | | | |
| $r_7$ | −72.237 | $d_7$ | 2.5 | $n_5$ | 1.65844 | $v_5$ | 50.9 | $L_5$ |
| $r_8$ | 66.46 | $d_8$ | 39.604 | | | | | |
| $r_9$ | −28.104 | $d_9$ | 1.3 | $n_6$ | 1.51742 | $v_6$ | 52.4 | $L_6$ |
| $r_{10}$ | 14.468 | $d_{10}$ | 4.1 | | | | | |
| $r_{11}$ | 35.034 | $d_{11}$ | 1.5 | $n_7$ | 1.59551 | $v_7$ | 39.2 | $L_7$ |

TABLE 1-continued

| $r_{12}$ | 15.477 | $d_{12}$ | 6.3 | $n_8$ | 1.7432 | $v_8$ | 49.3 | $L_8$ |
|---|---|---|---|---|---|---|---|---|
| $r_{13}$ | -32.728 | $d_{13}$ | 13 | | | | | |
| $r_{14}$ | 41.016 | $d_{14}$ | 2.4 | $n_9$ | 1.6727 | $v_9$ | 32.1 | $L_9$ |
| $r_{15}$ | 12.68 | $d_{15}$ | 8.6 | $n_{10}$ | 1.51633 | $v_{10}$ | 64.1 | $L_{10}$ |
| $r_{16}$ | -30.622 | | | | | | | |

Calculations are made using the above conditional expressions (1) to (5) on the basis of the above optical constants of the lenses:

$n_{1n}-n_{1p}=0.13255$ $v_{1p}-v_{1n}=33.9$ $|r_{2n}|=0.48 f_F$ $(r_{2p}/r_{2n})=1.56$ $n_{3n}=1.55647<n_{3p}=1.7432$

In this way, all the conditional expressions (1) to (5) are satisfied.

That is, the following conditions are satisfied:

$n_{1n}-n_{1p}>0.1$ (1)

$v_{1p}-v_{1n}>25$ (2)

$0.3f_F<|r_{2n}|<0.5f_F$ (3)

$1.4<(r_{2p}/r_{2n})<2.7$ (4)

$n_{3n}<n_{3p}$ (5)

where $n_{1p}$ and $v_{1p}$ respectively represent the refractive index and the Abbe's number of the convex lens of the first unit $G_1$, $n_{1n}$ and $v_{1n}$ respectively represent the refractive index and the Abbe's number of the concave lens of the first unit $G_1$, $r_{2p}$ represents the radius of curvature of a surface of the convex lens or the cemented lens of the convex lens and the concave lens in the second unit $G_2$ that at is furthermost from an object, $r_{2n}$ represents the radius of curvature of an object-side surface of the concave lens in the second unit $G_2$, $f_F$ represents the focal length of the entire front group $G_F$, $n_{3n}$ represents the average refractive index of the concave lenses in the third unit $G_3$, $n_{3p}$ represents the refractive index of the convex lens in the third unit $G_3$, and the refractive indices and the focal length are values for the d-line (587.56 nm).

FIGS. 2A, 2B, and 2C explain spherical aberration, astigmatism, and distortion in this embodiment, respectively. In these figures, d, F, and C represent the d-line, the F-line, and the C-line, NA represents the numerical aperture on the image side, and Y' represents the image height. FIGS. 2A, 2B, and 2C are obtained by tracing a light beam from the object toward the image, and show that the aberrations are corrected properly.

Table 2 shows the telecentricities of the principal ray of an off-axis beam when the object height is 10 mm, 14 mm, and 20 mm. The signs + and − on the angle in the telecentricity represent the direction in which the principal ray diverges with respect to the optical axis, and the direction in which the principal ray converges when the principal ray travels from the object toward the objective lens. Table 2 also shows that the telecentricity of the principal ray of the off-axis beam is corrected properly.

TABLE 2

| Object Height (Y) mm | 10 | 14 | 20 |
|---|---|---|---|
| Telecentricity | +0.0004° | +0.0011° | -0.0023° |

[Second Embodiment]

Figure 3:
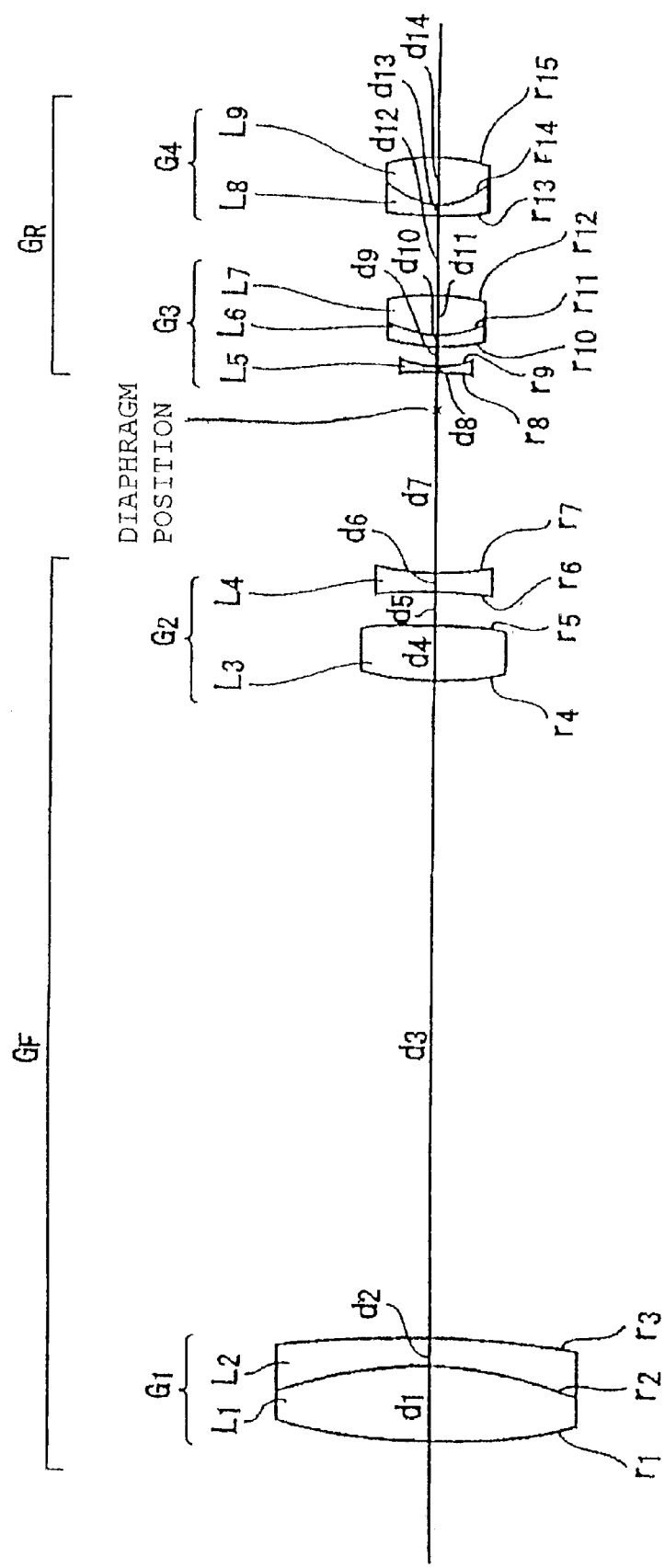
FIG. 3 is a structural view of a double telecentric objective lens according to a second embodiment of the present invention.
Figure 4:
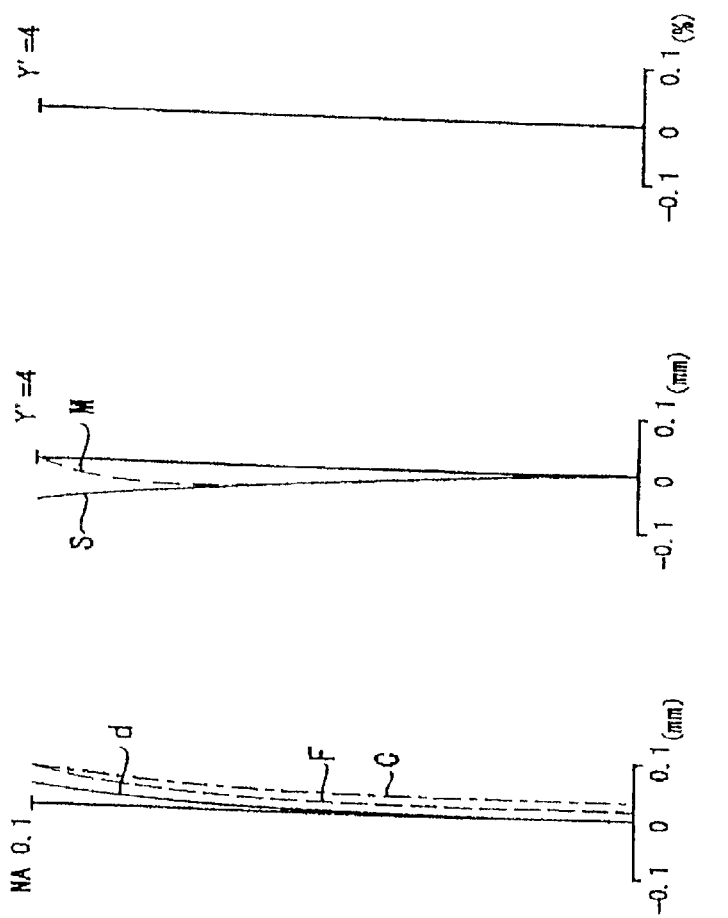
FIGS. 4A, 4B, and 4C are explanatory views showing spherical aberration, astigmatism, and distortion in the double telecentric objective lens of the second embodiment.

FIG. 3 shows the configuration of a double telecentric objective lens according to a second embodiment of the present invention, and FIGS. 4A, 4B, and 4C show spherical aberration, astigmatism, and distortion in the second embodiment.

The double telecentric objective lens of this embodiment is also composed of a front group $G_F$ having a positive refracting power as a whole and a rear group $G_R$ having a positive refracting power as a whole, in a manner similar to that in the first embodiment. The front group $G_F$ and the rear group $G_R$ are placed so that the back focus of the front group $G_F$ and the front focus of the rear group $G_R$ coincide with each other. A diaphragm is placed at the position where the focuses coincide.

The front group $G_F$ comprises a first unit $G_1$ formed of a cemented lens composed of a convex lens $L_1$ and a concave lens $L_2$, and having a positive refracting power as a whole, and a second unit $G_2$ including a convex lens $L_3$ and a concave lens $L_4$ arranged in that order from the object side, and having a positive refracting power as a whole.

The rear group $G_R$ comprises a third unit $G_3$ including a concave lens $L_5$ and a cemented lens composed of a concave lens $L_6$ and a convex lens $L_7$, and having a positive refracting power as a whole, and a fourth unit $G_4$ formed of a cemented lens composed of a concave lens $L_8$ and a convex lens $L_9$, and having a positive refracting power as a whole.

In such a configuration, the optical constants of the lenses are set as in Table 3 on conditions that the object position is −151.702 mm, the focal length of the front group (the focal length of the entire front group) $f_F$ is 150.06 mm, the image position is 35.445 mm, the focal length of the rear group is 29.98 mm, and the imaging magnification is −0.2×. The diaphragm is placed at a position offset by 30.045 mm from a surface $r_7$ toward the image.

Herein, $L_1$ to $L_9$ denote lenses, $r_1$ to $r_{15}$ denote the radii of curvature of the lenses, $d_1$ to $d_{14}$ denote the thicknesses of the lenses or spaces therebetween, $n_1$ to $n_9$ denote the d-line refractive indices of glass materials, and $v_1$ to $v_9$ denote the Abbe's numbers of the glass materials.

TABLE 3

| $r_1$ | 125.36 | $d_1$ | 13 | $n_1$ | 1.48749 | $v_1$ | 70.2 | $L_1$ |
|---|---|---|---|---|---|---|---|---|
| $r_2$ | -67.71 | $d_2$ | 4.5 | $n_2$ | 1.62004 | $v_2$ | 36.3 | $L_2$ |
| $r_3$ | -187 | $d_3$ | 120 | | | | | |
| $r_4$ | 56.56 | $d_4$ | 10 | $n_3$ | 1.57099 | $v_3$ | 50.8 | $L_3$ |
| $r_5$ | -82.5 | $d_5$ | 6 | | | | | |
| $r_6$ | -58.278 | $d_6$ | 3.8 | $n_4$ | 1.57501 | $v_4$ | 41.5 | $L_4$ |
| $r_7$ | 66.7 | $d_7$ | 36.278 | | | | | |
| $r_8$ | -40 | $d_8$ | 1.1 | $n_5$ | 1.6485 | $v_5$ | 53 | $L_5$ |
| $r_9$ | 14.003 | $d_9$ | 3.5 | | | | | |
| $r_{10}$ | 31.65 | $d_{10}$ | 2 | $n_6$ | 1.58144 | $v_6$ | 40.7 | $L_6$ |
| $r_{11}$ | 15.994 | $d_{11}$ | 7.3 | $n_7$ | 1.72916 | $v_7$ | 54.7 | $L_7$ |
| $r_{12}$ | -26.978 | $d_{12}$ | 14.2 | | | | | |
| $r_{13}$ | 58.74 | $d_{13}$ | 2 | $n_8$ | 1.60342 | $v_8$ | 38 | $L_8$ |
| $r_{14}$ | 12.496 | $d_{14}$ | 8.2 | $n_9$ | 1.48749 | $v_9$ | 70.2 | $L_9$ |
| $r_{15}$ | -25.654 | | | | | | | |

Calculations are made using the above conditional expressions (1) to (5) on the basis of the above optical constants of the lenses:

$n_{1n} - n_{1p} = 0.13255$ $v_{1p} - v_{1n} = 33.9$ $|r_{2n}| = 0.388 \, f_F$ $(r_{2p}/r_{2n}) = 1.42$ $n_{3n} = 1.61497 < n_{3p} = 1.72916$

In this way, all the conditional expressions (1) to (5) are satisfied.

FIGS. 4A, 4B, and 4C explain spherical aberration, astigmatism, and distortion in this embodiment, respectively. In these figures, d, F, and C represent the d-line, the F-line, and the C-line, NA represents the numerical aperture on the image side, and Y' represents the image height. FIGS. 4A, 4B, and 4C are obtained by tracing a light beam from the object toward the image, and show that the aberrations are corrected properly.

Table 4 shows the telecentricities of the principal ray of an off-axis beam when the object height is 10 mm, 14 mm, and 20 mm. The signs + and − on the angle in the telecentricity represent the direction in which the principal ray diverges with respect to the optical axis, and the direction in which the principal ray converges when the principal ray travels from the object toward the objective lens. Table 4 also shows that the telecentricity of the principal ray of the off-axis beam is corrected properly.

TABLE 4

| Object Height (Y) mm | 10 | 14 | 20 |
|---|---|---|---|
| Telecentricity | +0.0004° | +0.0011° | −0.0022° |

[Third Embodiment]

Figure 5:
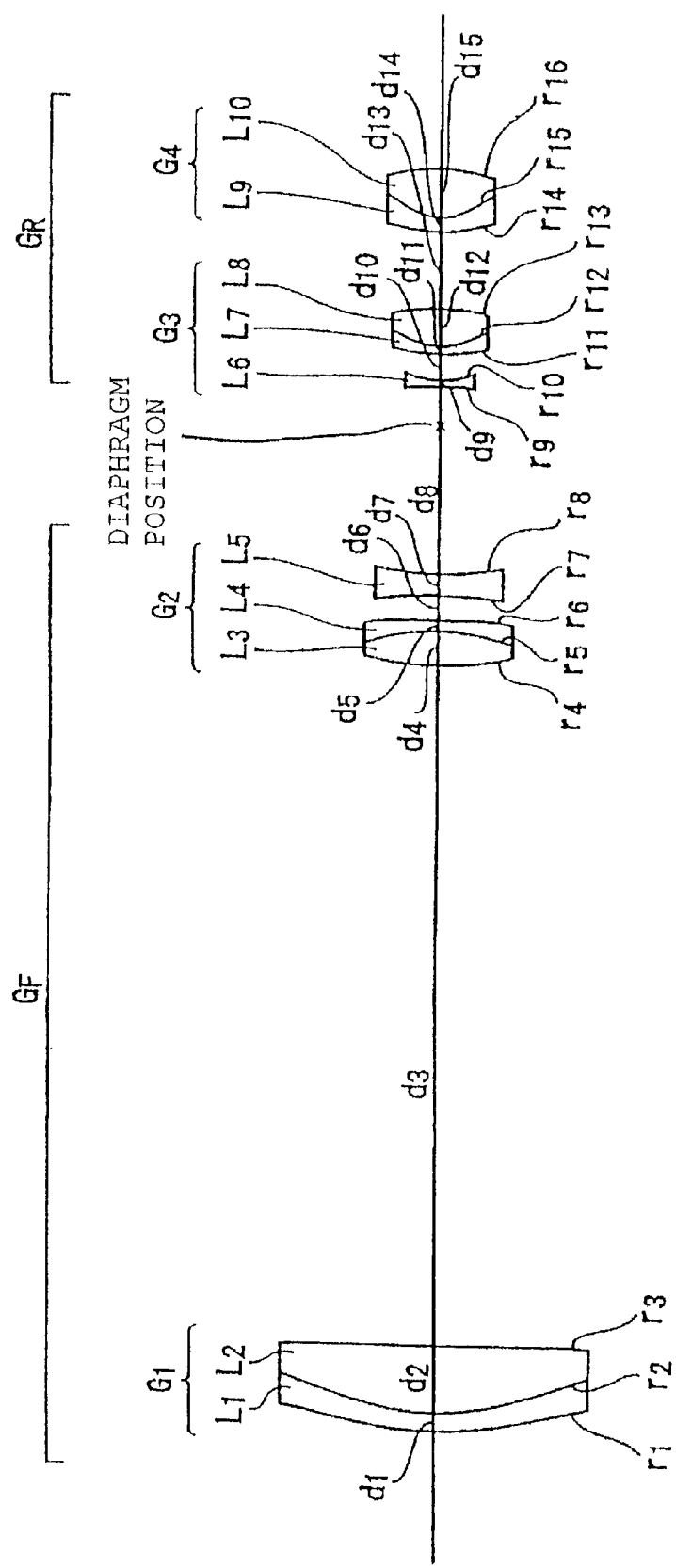
FIG. 5 is a structural view of a double telecentric objective lens according to a third embodiment of the present invention.
Figure 6:
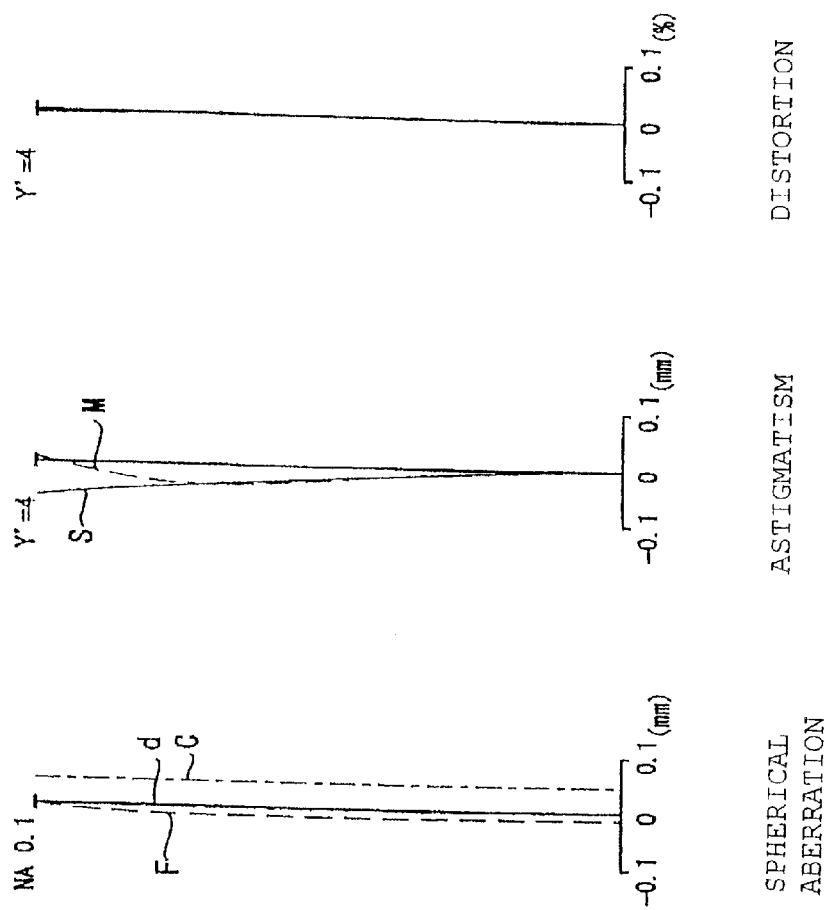
FIGS. 6A, 6B, and 6C are explanatory views showing spherical aberration, astigmatism, and distortion in the double telecentric objective lens of the third embodiment.

FIG. 5 shows the configuration of a double telecentric objective lens according to a third embodiment of the present invention, and FIGS. 6A, 6B, and 6C show spherical aberration, astigmatism, and distortion in the third embodiment.

The double telecentric objective lens of this embodiment is also composed of a front group $G_F$ having a positive refracting power as a whole, and a rear group $G_R$ having a positive refracting power as a whole, in a manner similar to that in the first embodiment. The front group $G_F$ and the rear group $G_R$ are placed so that the back focus of the front group $G_F$ and the front focus of the rear group $G_R$ coincide with each other. A diaphragm is placed at the position where the focuses coincide.

The front group $G_F$ comprises a first unit $G_1$ formed of a cemented lens composed of a convex lens $L_1$ and a concave lens $L_2$, and having a positive refracting power as a whole, and a second unit $G_2$ including a cemented lens composed of a convex lens $L_3$ and a concave lens $L_4$, and a concave lens $L_5$ arranged in that order from the object side, and having a positive refracting power as a whole.

The rear group $G_R$ comprises a third unit $G_3$ including a concave lens $L_6$, and a cemented lens composed of a concave lens $L_7$ and a convex lens $L_8$, and having a positive refracting power as a whole, and a fourth unit $G_4$ formed of a cemented lens composed of a concave lens $L_9$ and a convex lens $L_{10}$, and having a positive refracting power as a whole.

In such a configuration, the optical constants of the lenses are set as in Table 5 on conditions that the object position is −159.623 mm, the focal length of the front group (the focal length of the entire front group) $f_F$ is 150.00 mm, the image position is 33.175 mm, the focal length of the rear group is 30.06 mm, and the imaging magnification is −0.2×. The diaphragm is placed at a position offset by 25.97 mm from a surface $r_8$ toward the image.

Herein, $L_1$ to $L_{10}$ denote lenses, $r_1$ to $r_{16}$ denote the radii of curvature of the lenses, $d_1$ to $d_{15}$ denote the thicknesses of the lenses or the spaces therebetween, $n_1$ to $n_{10}$ denote the d-line refractive indices of glass materials, and $v_1$ to $v_{10}$ denote the Abbe's numbers of the glass materials.

TABLE 5

| $r_1$ | 95.262 | $d_1$ | 3 | $n_1$ | 1.8061 | $v_1$ | 33.3 | $L_1$ |
|---|---|---|---|---|---|---|---|---|
| $r_2$ | 51.5 | $d_2$ | 12 | $n_2$ | 1.62041 | $v_2$ | 60.3 | $L_2$ |
| $r_3$ | −840 | $d_3$ | 120 | | | | | |
| $r_4$ | 87.985 | $d_4$ | 6 | $n_3$ | 1.7433 | $v_3$ | 49.2 | $L_3$ |
| $r_5$ | −34.9 | $d_5$ | 2 | $n_4$ | 1.59551 | $v_4$ | 39.2 | $L_4$ |
| $r_6$ | −137 | $d_6$ | 5 | | | | | |
| $r_7$ | −52.483 | $d_7$ | 3 | $n_5$ | 1.60738 | $v_5$ | 56.8 | $L_5$ |
| $r_8$ | 88 | $d_8$ | 33.257 | | | | | |
| $r_9$ | −27.856 | $d_9$ | 1.2 | $n_6$ | 1.51742 | $v_6$ | 52.2 | $L_6$ |
| $r_{10}$ | 14.66 | $d_{10}$ | 4.1 | | | | | |
| $r_{11}$ | 35.285 | $d_{11}$ | 1.5 | $n_7$ | 1.59551 | $v_7$ | 39.2 | $L_7$ |
| $r_{12}$ | 15.64 | $d_{12}$ | 6.3 | $n_8$ | 1.7433 | $v_8$ | 49.2 | $L_8$ |
| $r_{13}$ | −32.822 | $d_{13}$ | 13 | | | | | |
| $r_{14}$ | 41.019 | $d_{14}$ | 2.5 | $n_9$ | 1.6727 | $v_9$ | 32.2 | $L_9$ |
| $r_{15}$ | 12.67 | $d_{15}$ | 8.6 | $n_{10}$ | 1.5168 | $v_{10}$ | 64.2 | $L_{10}$ |
| $r_{16}$ | −30.5 | | | | | | | |

Calculations are made using the above conditional expressions (1) to (5) on the basis of the above optical constants of the lenses:

$n_{1n} - n_{1p} = 0.18569$ $v_{1p} - v_{1n} = 27$ $|r_{2n}| = 0.35 \, f_F$ $(r_{2p}/r_{2n}) = 2.6$ $n_{3n} = 1.55647 < n_{3p} = 1.7433$

In this way, all the conditional expressions (1) to (5) are satisfied.

FIGS. 6A, 6B, and 6C explain spherical aberration, astigmatism, and distortion in this embodiment, respectively. In these figures, d, F, and C represent the d-line, the F-line, and the C-line, NA represents the numerical aperture on the image side, and Y' represents the image height. FIGS. 6A, 6B, and 6C are obtained by tracing a light beam from the object toward the image, and show that the aberrations are corrected properly.

Table 6 shows the telecentricities of the principal ray of an off-axis beam when the object height is 10 mm, 14 mm, and 20 mm. The signs + and − on the angle in the telecentricity represents the direction in which the principal ray diverges with respect to the optical axis and the direction in which the principal ray converges when the principal ray travels from the object toward the objective lens. Table 6 also shows that the telecentricity of the principal ray of the off-axis beam is corrected properly.

TABLE 6

| Object Height (Y) mm | 10 | 14 | 20 |
|---|---|---|---|
| Telecentricity | +0.0007° | +0.0014° | −0.0007° |

[Fourth Embodiment]

Figure 7:
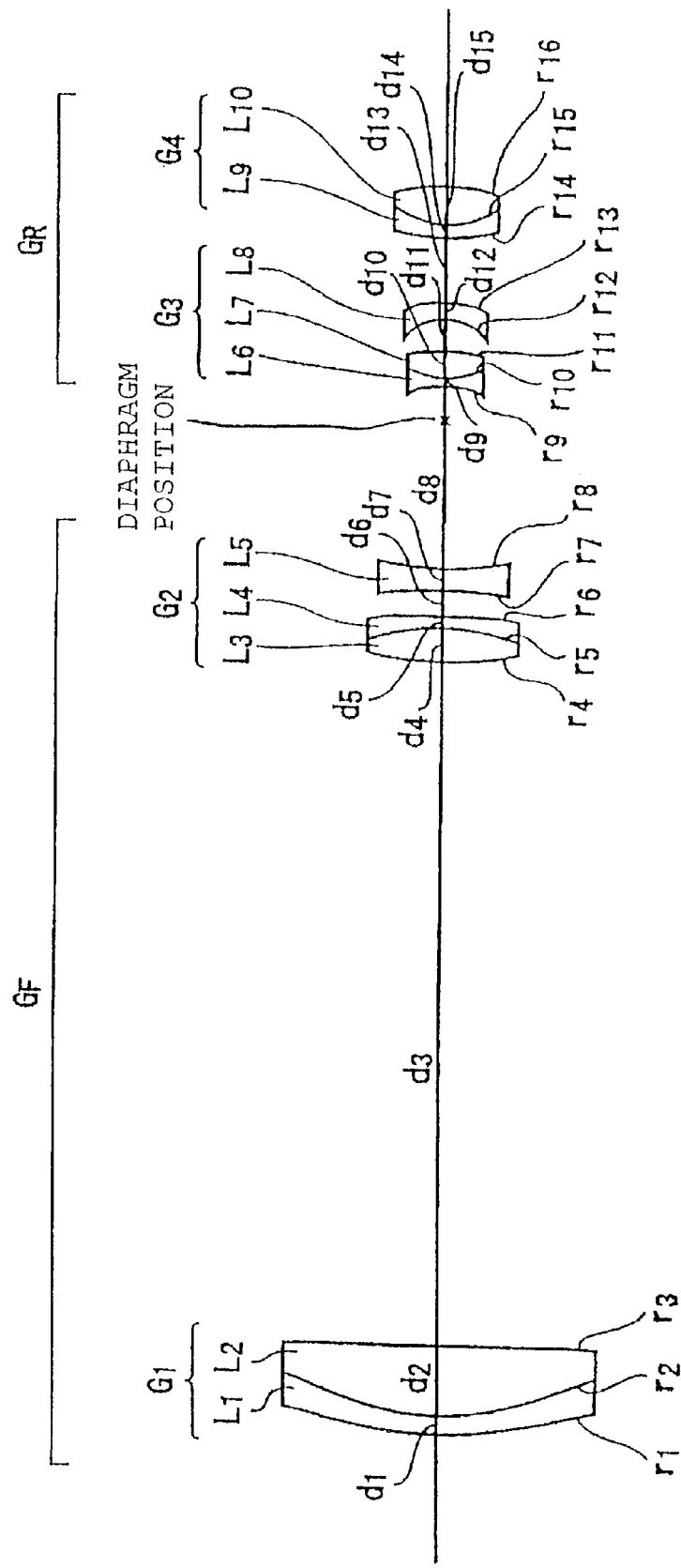
FIG. 7 is a structural view of a double telecentric objective lens according to a fourth embodiment of the present invention.

FIG. 7 shows the configuration of a double telecentric objective lens according to a fourth embodiment of the present invention, and FIGS. 8A, 8B, and 8C show spherical aberration, astigmatism, and distortion in the fourth embodiment.

The double telecentric objective lens of this embodiment is also composed of a front group $G_F$ having a positive refracting power as a whole and a rear group $G_R$ having a positive refracting power as a whole, in a manner similar to that in the first embodiment. The front group $G_F$ and the rear group $G_R$ are placed so that the back focus of the front group $G_F$ and the front focus of the rear group $G_R$ coincide with each other. A diaphragm is placed at the position where the focuses coincide.

The front group $G_F$ comprises a first unit $G_1$ formed of a cemented lens composed of a concave lens $L_1$ and a convex lens $L_2$, and having a positive refracting power as a whole, and a second unit $G_2$ including a cemented lens composed of a convex lens $L_3$ and a concave lens $L_4$, and a concave lens $L_5$ arranged in that order from the object side, and having a positive refracting power as a whole.

The rear group $G_R$ comprises a third unit $G_3$ including a cemented lens composed of a concave lens $L_6$ and a concave lens $L_7$, and a concave lens $L_8$ and having a positive refracting power as a whole, and a fourth unit $G_4$ formed of a cemented lens composed of a concave lens $L_9$ and a convex lens $L_{10}$, and having a positive refracting power as a whole.

In such a configuration, the optical constants of the lenses are set as in Table 7 on conditions that the object position is −161.051 mm, the focal length of the front group (the focal length of the entire front group) $f_F$ is 150.01 mm, the image position is 26.213 mm, the focal length of the rear group is 30.01 mm, and the imaging magnification is −0.2×. The diaphragm is placed at a position offset by 26.03 mm from a surface $r_8$ toward the image.

Herein, $L_1$ to $L_{10}$ denote lenses, $r_1$ to $r_{16}$ denote the radii of curvature of the lenses, $d_1$ to $d_{15}$ denote the thicknesses of the lenses or the spaces therebetween, $n_1$ to $n_{10}$ denote the d-line refractive indices of glass materials, and $v_1$ to $v_{10}$ denote the Abbe's numbers of the glass materials.

TABLE 7

| | | | | | | | |
|---|---|---|---|---|---|---|---|
| $r_1$ | 96.68 | $d_1$ | 3 | $n_1$ | 1.8061 | $v_1$ | 33.3 | $L_1$ |
| $r_2$ | 51.315 | $d_2$ | 12 | $n_2$ | 1.62041 | $v_2$ | 60.3 | $L_2$ |
| $r_3$ | −700 | $d_3$ | 120 | | | | |
| $r_4$ | 88.766 | $d_4$ | 6 | $n_3$ | 1.7433 | $v_3$ | 49.2 | $L_3$ |
| $r_5$ | −33.937 | $d_5$ | 2 | $n_4$ | 1.59551 | $v_4$ | 39.2 | $L_4$ |
| $r_6$ | −134.849 | $d_6$ | 5 | | | | |
| $r_7$ | −54 | $d_7$ | 3 | $n_5$ | 1.60738 | $v_5$ | 56.8 | $L_5$ |
| $r_8$ | 81.51 | $d_8$ | 32.583 | | | | |
| $r_9$ | −12.159 | $d_9$ | 1.2 | $n_6$ | 1.54072 | $v_6$ | 47.2 | $L_6$ |
| $r_{10}$ | 10.16 | $d_{10}$ | 5 | $n_7$ | 1.741 | $v_7$ | 52.7 | $L_7$ |
| $r_{11}$ | −14.72 | $d_{11}$ | 5 | | | | |
| $r_{12}$ | −7.8 | $d_{12}$ | 3 | $n_8$ | 1.51823 | $v_8$ | 59 | $L_8$ |
| $r_{13}$ | −14.259 | $d_{13}$ | 11 | | | | |
| $r_{14}$ | 44.09 | $d_{14}$ | 2 | $n_9$ | 1.7495 | $v_9$ | 35 | $L_9$ |
| $r_{15}$ | 12.398 | $d_{15}$ | 6.5 | $n_{10}$ | 1.64 | $v_{10}$ | 60.2 | $L_{10}$ |
| $r_{16}$ | −27.837 | | | | | | |

Calculations are made using the above conditional expressions (1) to (5) on the basis of the above optical constants of the lenses:

$n_{1n} - n_{1p} = 0.18569$ $v_{1p} - v_{1n} = 27$ $|r_{2n}| = 0.36 f_F$ $(r_{2p}/r_{2n}) = 2.5$ $n_{3n} = 1.52948 < n_{3p} = 1.741$

In this way, all the conditional expressions (1) to (5) are satisfied.

FIGS. 8A, 8B, and 8C explain spherical aberration, astigmatism, and distortion in this embodiment, respectively. In these figures, d, F, and C represent the d-line, the F-line, and the C-line, NA represents the numerical aperture on the image side, and Y' represents the image height. FIGS. 8A, 8B, and 8C are obtained by tracing a light beam from the object toward the image, and show that the aberrations are corrected properly.

Table 8 shows the telecentricities of the principal ray of an off-axis beam when the object height is 10 mm, 14 mm, and 20 mm. The signs + and − on the angle in the telecentricity represents the direction in which the principal ray diverges with respect to the optical axis and the direction in which the principal ray converges when the principal ray travels from the object toward the objective lens. Table 8 also shows that the telecentricity of the principal ray of the off-axis beam is corrected properly.

TABLE 8

| Object Height (Y) mm | 10 | 14 | 20 |
|---|---|---|---|
| Telecentricity | +0.0004° | +0.0011° | −0.0017° |

While the focal length of the front group is approximately 150 mm, the focal length of the rear group is approximately 30 mm, and the magnification is approximately 0.2× in the double telecentric objective lenses of the above embodiments, the objective lenses can be used as a double telecentric objective lens of 0.1×, for example, by doubling the focal length of the front group to 300 mm and placing the rear focus of the front group in accordance with the telecentric diaphragm.

While the values in the above embodiments are set when the image height Y' is 4 mm, the double telecentric objective lenses can be used as a double telecentric objective lens having an image height Y' of 8 mm by doubling the values.

It is, of course, possible to change the magnification and to increase or decrease the effective image circle, as described above, within the technical scope of the invention.

According to the present invention, it is possible to achieve a double telecentric objective lens having a magnification of approximately 0.2× in which aberrations and the telecentricity of the principal ray of an off-axis beam are corrected properly, and which is suitable for use in an image processing and measuring apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A double telecentric objective lens having a double telecentric optical system, wherein said double telecentric optical system comprises: a front group having a positive refracting power as a whole; and a rear group having a positive refracting power as a whole, wherein a rear focus of said front group and a front focus of said rear group coincide with each other, and a diaphragm is placed at a position where the front and rear focuses coincide, wherein said front group includes a first unit and a second unit, said first unit being formed of a cemented lens composed of a convex lens and a concave lens, and having a positive refracting power as a whole, said second unit including a convex lens or a cemented lens composed of a convex lens and a concave lens, and a concave lens, arranged in that order from an object side, and having a positive refracting power as a whole, wherein said rear group includes a third unit and a fourth unit, said third unit including a concave lens and a cemented lens composed of a convex lens and a concave lens, and having a positive refracting power as a whole, said fourth unit being formed of a cemented lens composed of a convex lens and a concave lens, and having a positive refracting power as a whole, and wherein the following conditions are satisfied:

$$n_{1n} - n_{1p} > 0.1 \tag{1}$$

$$v_{1p} - v_{1n} > 25 \tag{2}$$

$$0.3 f_F < |r_{2n}| < 0.5 f_F \tag{3}$$

$$1.4 < (r_{2p}/r_{2n}) < 2.7 \tag{4}$$

$$n_{3n} < n_{3p} \tag{5}$$

where $n_{1p}$ and $v_{1p}$ respectively represent a refractive index and an Abbe's number of said convex lens of said first unit, $n_{1n}$ and $v_{1n}$ respectively represent a refractive index and an Abbe's number of said concave lens of said first unit, $r_{2p}$ represents a radius of curvature of a surface of said convex lens or said cemented lens composed of said convex lens and said concave lens in said second unit that is furthermost from an object, $r_{2n}$ represents a radius of curvature of an object-side surface of said concave lens in said second unit, $f_F$ represents a focal length of said entire front group, $n_{3n}$ represents an average refractive index of said concave lenses in said third unit, $n_{3p}$ represents a refractive index of said convex lens in said third unit, and a refractive indices and focal length are values for the d-line (587.56 nm).

* * * * *

UNITED STATES PATENT AND TRADEMARK OFFICE
CERTIFICATE OF CORRECTION

PATENT NO. : 6,639,653 B2
DATED : October 28, 2003
INVENTOR(S) : Nagahama et al.

It is certified that error appears in the above-identified patent and that said Letters Patent is hereby corrected as shown below:

<u>Title page,</u>
Item [57], ABSTRACT,
Line 17, Formula (3), delete "$0.3f_F$-$r_{2n}$<$0.5f_F$" and insert -- $0.3f_F$<|$r_{2n}$|<$0.5f_F$ --.

<u>Column 11,</u>
Line 15, Formula (1), delete "$_{1n}$-$n_{1p}$<0.1" and insert -- $n_{1n}$-$n_{1p}$<0.1 --.

Signed and Sealed this

Thirteenth Day of January, 2004

JON W. DUDAS
*Acting Director of the United States Patent and Trademark Office*